United States Patent
Huang et al.

(10) Patent No.: US 7,663,410 B2
(45) Date of Patent: Feb. 16, 2010

(54) CURRENT-MODE DIFFERENTIAL TRANSMITTER AND RECEIVER

(75) Inventors: Chih-Haur Huang, Tainan County (TW); Yuan-Kai Chu, Tainan County (TW)

(73) Assignee: Himax Technologies Limited, Tainan County (TW)

(*) Notice: Subject to any disclaimer, the term of this patent is extended or adjusted under 35 U.S.C. 154(b) by 0 days.

(21) Appl. No.: 11/905,796

(22) Filed: Oct. 4, 2007

(65) Prior Publication Data
US 2009/0091356 A1 Apr. 9, 2009

(51) Int. Cl.
*H02M 11/00* (2006.01)
(52) U.S. Cl. .................. 327/103; 327/108; 323/315; 330/257
(58) Field of Classification Search .................. None
See application file for complete search history.

(56) References Cited
U.S. PATENT DOCUMENTS 5,504,782 A * 4/1996 Campbell, Jr. ............ 375/259
5,594,383 A * 1/1997 Tamba ...................... 327/552
6,504,432 B1 * 1/2003 Rokhsaz ................... 330/258
6,624,701 B2 * 9/2003 Chrappan Soldavini ..... 330/288
6,888,407 B2 * 5/2005 Ramazan et al. ............ 330/258

* cited by examiner

*Primary Examiner*—An T Luu
(74) *Attorney, Agent, or Firm*—Rabin & Berdo, P.C.

(57) ABSTRACT

A current-mode differential transmitter, receiving a single-end input voltage signal and accordingly generating a differential output current signal, is provided. The transmitter includes a first switch, a second switch and a current mirror. The first switch is coupled in a first current path and controlled by the single-end input voltage signal. The second switch is coupled in a second current path and controlled by an inverted signal of the single-end input voltage signal. The current mirror mirrors a reference current to the first current path when the first switch is turned on, and mirrors the reference current to the second current path when the second switch is turned on. The differential output current signal is derived from the currents on the first and second current paths.

12 Claims, 5 Drawing Sheets

CURRENT-MODE DIFFERENTIAL TRANSMITTER AND RECEIVER

BACKGROUND OF THE INVENTION

1. Field of the Invention

The invention relates in general to a current-mode differential transmitter and receiver and more particularly to a current-mode differential transmitter and receiver with low noise and large data swing.

2. Description of the Related Art

FIG. 1 shows a circuit diagram of a conventional current-mode transmitter. The current-mode transmitter 100 receives an input voltage signal VI, and accordingly generates an output current signal $I_{out}$. The current-mode transmitter 100 includes two switches implemented by NMOS transistors M6 and M7, and a current mirror composed of NMOS transistors M1~M5. The switch M6 is coupled in a current path CP11 and controlled by the input voltage signal VI. The switch M7 has one end receiving a supply voltage $V_{DD}$ and the other end coupled to one end of the switch M6, and controlled by the inverted signal VIB of the input voltage signal VI.

The current mirror mirrors a reference current IB to a current path CP12. The current mirror also mirrors the reference current IB to the current path CP11 when the switch M6 is turned on. The current value of the output current signal $I_{out}$ is a sum of the currents on the current paths CP11 and CP12. When a voltage level of the input voltage signal VI is a low voltage level, the switch M6 is turned on. Thus, the current signal $I_{out}$ has a current value of $2I_B$. When a voltage level of the signal VI is a high voltage level, the switch M6 is turned off. Thus, the current signal $I_{out}$ has a current value of $I_B$.

FIG. 2 shows a circuit diagram of a conventional current-mode receiver. The current-mode receiver 200 receives an input current signal $I_{out}$, and accordingly generates an output voltage signal on an output terminal OUT. The current-mode receiver 200 includes a PMOS transistor M10, a NMOS transistor M9, a current source implemented by a PMOS transistor M8, and a current mirror composed of PMOS transistors M4 and M6, and NMOS transistors M7.

The current mirror mirrors the input current signal $I_{out}$ to a current path CP21, and the current source generates a reference current $I_{CM}$ flowing in a current path CP22. The transistor M10 has a source receiving a supply voltage $V_{DD}$ and a drain coupled to the output terminal OUT. The transistor M9 has a drain coupled to the output terminal OUT and a source receiving a ground voltage GND. The gate-to-source voltages of the transistors M9 and M10 are determined respectively according to currents flowing in the current paths CP21 and CP22.

The current-mode receiver 200 further includes a NMOS transistor M5, and a bias voltage generation circuit composed of PMOS transistors M1 and M2, and a NMOS transistor M3. The bias voltage generation circuit provides a bias voltage as the gate-to-source voltage of the transistor M5 such that it is turned on. If the input current signal $I_{out}$ has a current value smaller than that of the reference current $I_{CM}$, the voltage level on the output terminal OUT is the supply voltage $V_{DD}$. If the input current signal $I_{out}$ has a current value larger than that of the reference current $I_{CM}$, the voltage level on the output terminal OUT is the ground voltage GND.

The above-mentioned current-mode transmitter and receiver both have a form of single-end output or input and thus are subject to noise interference.

SUMMARY OF THE INVENTION

It is therefore an object of the invention to provide a current-mode differential transmitter and receiver with low noise and large data swing.

According to a first aspect of the present invention, a current-mode differential transmitter, receiving a single-end input voltage signal and accordingly generating a differential output current signal, is provided. The transmitter includes a first switch, a second switch and a current mirror. The first switch is coupled in a first current path and controlled by the single-end input voltage signal. The second switch is coupled in a second current path and controlled by an inverted signal of the single-end input voltage signal. The current mirror mirrors a reference current to the first current path when the first switch is turned on, and mirrors the reference current to the second current path when the second switch is turned on. The differential output current signal is derived from the currents on the first and second current paths.

According to a second aspect of the present invention, a current-mode differential receiver, receiving a differential input current signal and accordingly generating a single-end output voltage signal on an output terminal, is provided. The receiver includes a first current mirror, a first transistor and a second transistor. The first current mirror mirrors a positive-end current signal of the differential input current signal to a first current path, and mirrors a negative-end current signal of the differential input current signal to a second current path. The first transistor has a source receiving a supply voltage and a drain coupled to the output terminal. The second transistor has a drain coupled to the output terminal and a source receiving a ground voltage. Gate-to-source voltages of the first and second transistors are determined respectively according to currents flowing in the first and second current paths.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
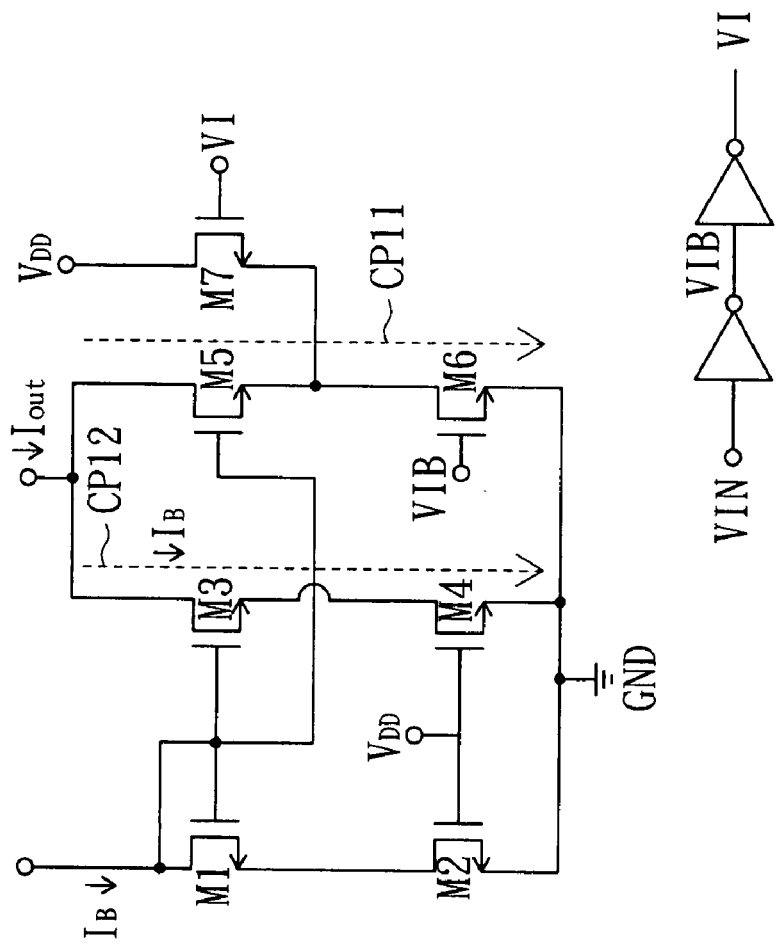
FIG. 1 is a circuit diagram of a conventional current-mode transmitter.
Figure 2:
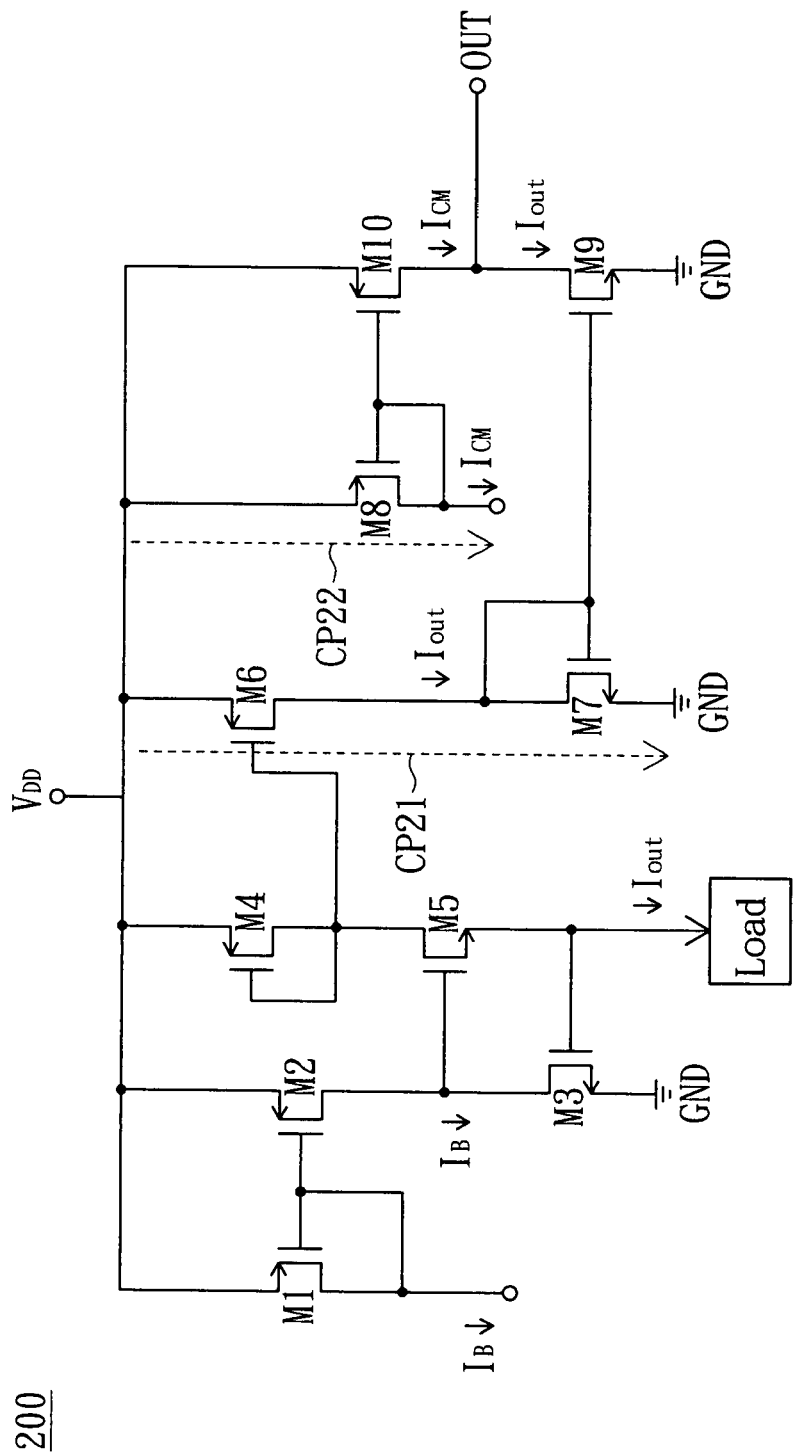
FIG. 2 is a circuit diagram of a conventional current-mode receiver.
Figure 3A:
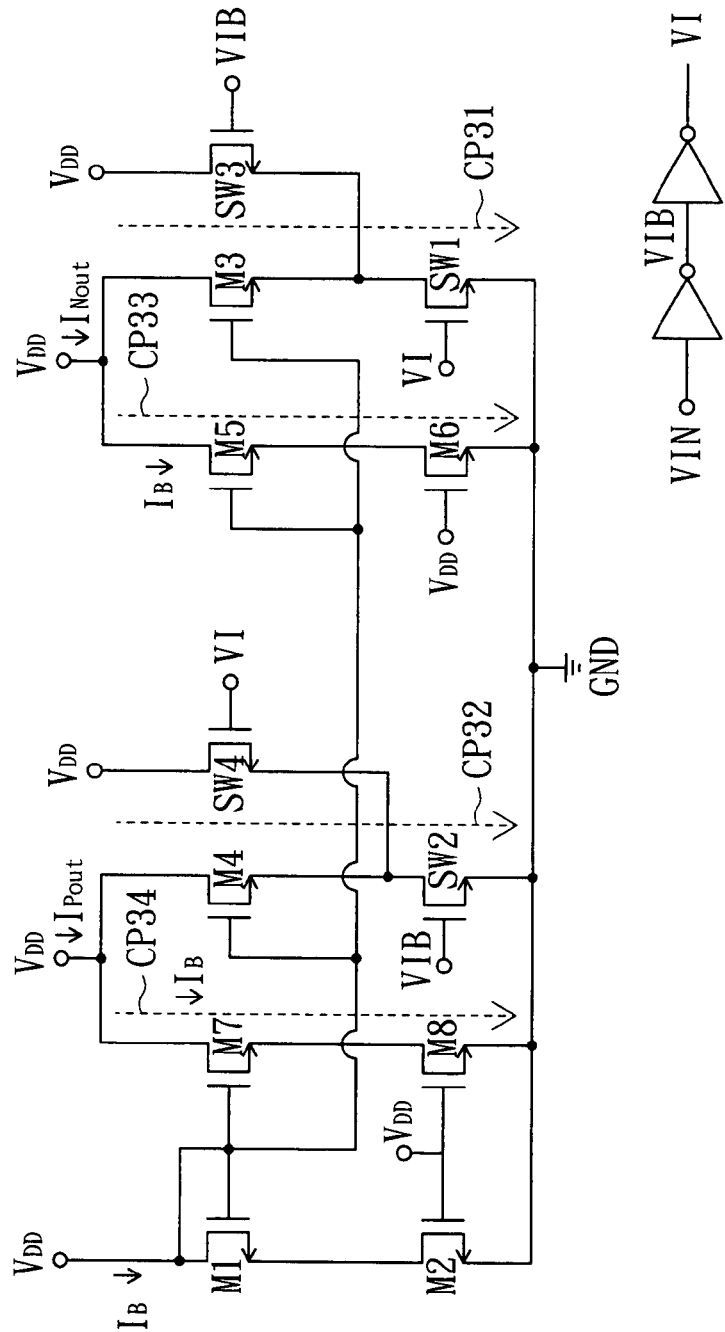
FIG. 3A is a circuit diagram of a current-mode differential transmitter according to a preferred embodiment of the invention.

FIG. 3A shows a circuit diagram of a current-mode differential transmitter according to a preferred embodiment of the invention. The current-mode differential transmitter 300 receives a single-end input voltage signal VI, and accordingly generates a differential output current signal derived from a positive-end current signal $I_{Pout}$ and a negative-end current signal $I_{Nout}$. The current-mode differential transmitter 300 includes four switches SW1~SW4 implemented by NMOS transistors, and a current mirror composed of NMOS transistors M1~M8.

The first switch SW1 is coupled in a current path CP31 and controlled by the single-end input voltage signal VI. The second switch SW2 is coupled in a current path CP32 and controlled by an inverted signal VIB of the single-end input voltage signal VI. The third switch SW3 has one end receiving a supply voltage $V_{DD}$ and the other end coupled to one end of the first switch SW1, and controlled by the inverted signal VIB of the single-end input voltage signal VI. The fourth switch SW4 has one end receiving the supply voltage $V_{DD}$ and the other end coupled to one end of the second switch SW2, and controlled by the single-end input voltage signal VI.

The current mirror mirrors a reference current IB to a third current path CP33 and a fourth current path CP34. The current mirror also mirrors the reference current IB to the first current path CP31 when the first switch SW1 is turned on, and also mirrors the reference current IB to the second current path CP32 when the second switch SW2 is turned on. The differential output current signal is a difference between the negative-end current signal $I_{Nout}$, which is a sum of the currents on the current paths CP31 and CP33, and the positive-end current signal $I_{Pout}$, which is a sum of the currents on the current paths CP32 and CP34.

The first transistor M1 has a drain coupled to the supply voltage $V_{DD}$ and a gate coupled to the drain. The second transistor M2 has a drain coupled to a source of the first transistor M1, a gate receiving the supply voltage $V_{DD}$ and a source receiving the ground voltage GND. The third transistor M3 is coupled in the first current path CP31, and has a drain receiving the supply voltage $V_{DD}$, a gate coupled to the gate of the first transistor M1 and a source coupled to one end of the first switch SW1. The fourth transistor M4 is coupled in the second current path CP32, and has a drain receiving the supply voltage $V_{DD}$, a gate coupled to the gate of the first transistor M1 and a source coupled to one end of the second switch SW2. The reference current IB is a current flowing through the transistors M1 and M2.

The fifth transistor M5 is coupled in the third current path CP33, and has a drain receiving the supply voltage $V_{DD}$ and a gate coupled to the gate of the first transistor M1. The sixth transistor M6 is coupled in the third current path CP33, and has a drain coupled to a source of the fifth transistor M5, a gate receiving the supply voltage $V_{DD}$ and a source receiving the ground voltage GND.

The seventh transistor M7 is coupled in the fourth current path CP34, and has a drain receiving the supply voltage $V_{DD}$ and a gate coupled to the gate of the first transistor M1. The eighth transistor M8 is coupled in the fourth current path CP34, and has a drain coupled to a source of the seventh transistor M7, a gate receiving the supply voltage $V_{DD}$ and a source receiving the ground voltage GND. The transistors M1~M8 and switches SW1~SW4 are exemplified to be implemented by NMOS transistors, but the invention is not limited thereto.

When a voltage level of the single-end input voltage signal VI is a low voltage level, the second switch SW2 is turned on, and the fourth switch SW4 is turned off. Thus, the positive-end current signal $I_{Pout}$ has a current value of $2I_B$. Meanwhile, the first switch SW1 is turned off and the third switch SW3 is turned on, so that the source of the third transistor M3 receives the supply voltage $V_{DD}$, and the negative-end current signal $I_{Nout}$ has a current value of $I_B$. Therefore, the differential output current signal has a current value of $2I_B-I_B=I_B$.

When the voltage level of the single-end input voltage signal VI is a high voltage level, the first switch SW1 is turned on, and the third switch SW3 is turned off. Thus, the negative-end current signal $I_{Nout}$ has a current value of $2I_B$. Meanwhile, the second switch SW2 is turned off and the fourth switch SW4 is turned on, so that the source of the fourth transistor M4 receives the supply voltage $V_{DD}$, and the positive-end current signal $I_{Pout}$ has a current value of $I_B$. Therefore, the differential output current signal has a current value of $I_B-2I_B=-I_B$.

The data swing at the output terminal of the current-mode differential transmitter 300 is double of the data swing of a conventional current mode transmitter. In addition, owing that the output level is determined by the difference between the positive-end current signal $I_{Pout}$ and the negative-end current signal $I_{Nout}$, the noise interference at the output terminal can be eliminated.

Figure 3B:
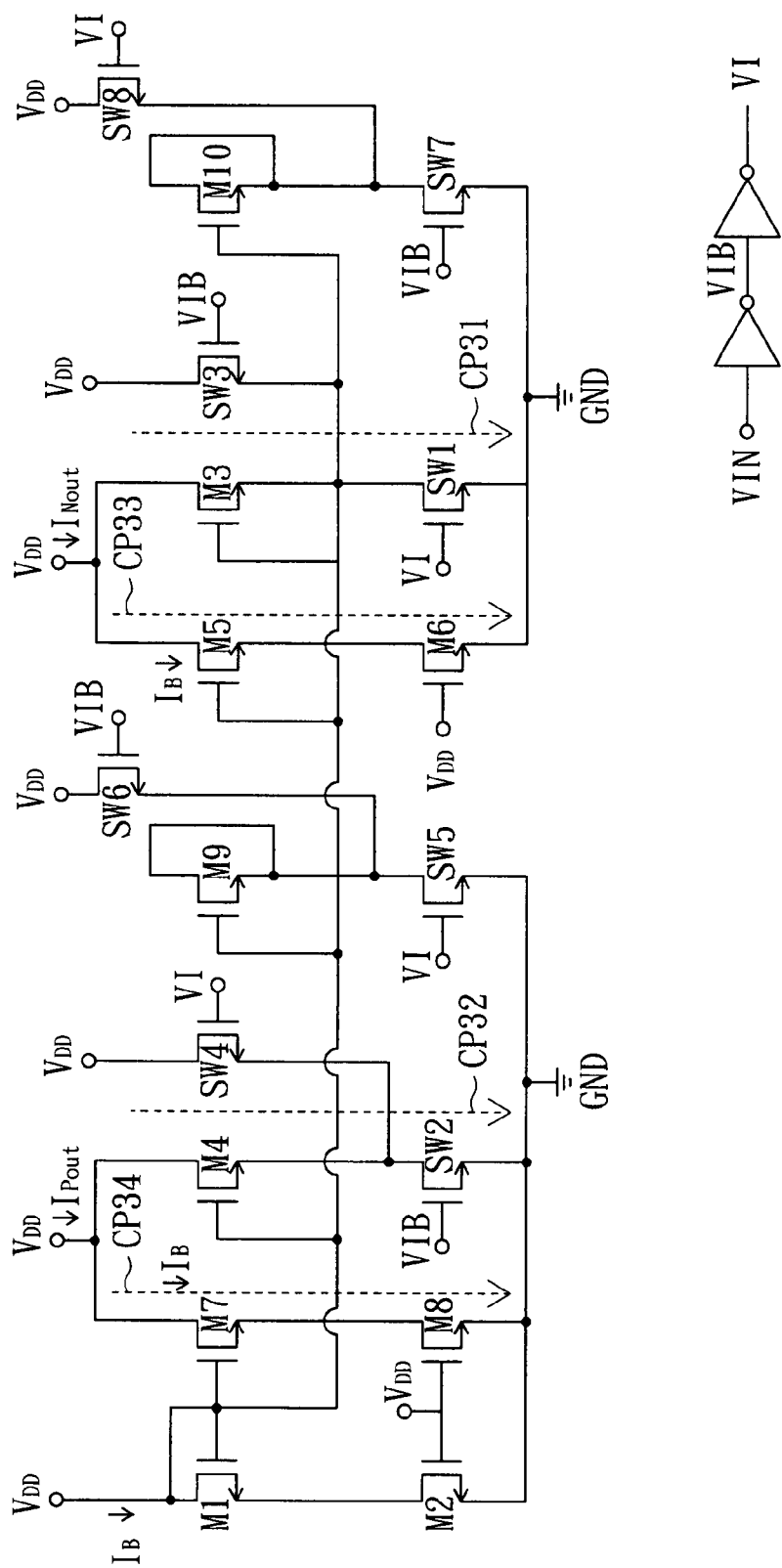
FIG. 3B is a circuit diagram of a current-mode differential transmitter according to another preferred embodiment of the invention.

FIG. 3B shows a circuit diagram of a current-mode differential transmitter according to another preferred embodiment of the invention. It is almost the same as the circuit of FIG. 3A except it includes a compensation circuit composed of switches SW5~SW8 and transistors M9 and M10, which are exemplified to be implemented by NMOS transistors. The ninth transistor M9 has a drain and a source coupled together, and a gate coupled to the gate of the first transistor M1. The fifth switch SW5 is controlled by the single-end input voltage signal VI, and has one end receiving the ground voltage GND and the other end coupled to the source of the ninth transistor M9. The sixth switch SW6 is controlled by the inverted signal VIB of the single-end input voltage signal VI, and has one end receiving the supply voltage $V_{DD}$ and the other end coupled to the source of the ninth transistor M9.

The tenth transistor M10 has a drain and a source coupled together, and a gate coupled to the gate of the first transistor M1. The seventh switch SW7 is controlled by the inverted signal VIB of the single-end input voltage signal VI, and has one end receiving the ground voltage GND and the other end coupled to the source of the tenth transistor M10. The eighth switch SW8 is controlled by the single-end input voltage signal VI, and has one end receiving the supply voltage $V_{DD}$ and the other end coupled to the source of the tenth transistor M10.

Figure 4:
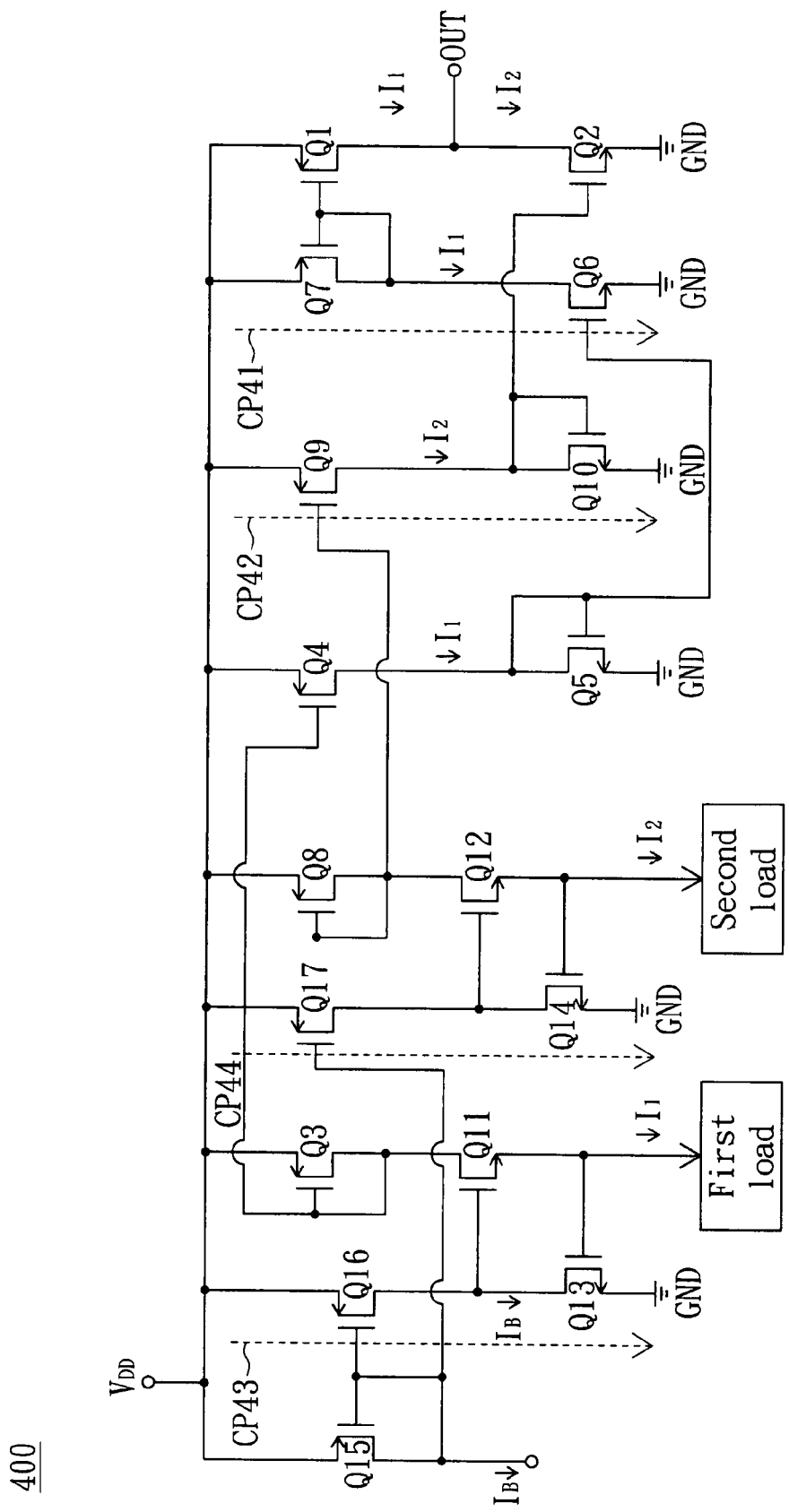
FIG. 4 is a circuit diagram of a current-mode differential receiver according to the preferred embodiment of the invention.

FIG. 4 shows a circuit diagram of a current-mode differential receiver according to a preferred embodiment of the invention. The current-mode differential receiver 400 receives a differential input current signal derived from a positive-end current signal $I_1$ and a negative-end current signal $I_2$, and accordingly generates a single-end output voltage signal on an output terminal OUT. The receiver 400 includes a PMOS transistor Q1, a NMOS transistor Q2 and a current mirror composed of PMOS transistors Q3, Q8, Q4, Q9 and Q7, and NMOS transistors Q5, Q10 and Q6.

The current mirror mirrors the positive-end current signal $I_1$ to a first current path CP41, and mirrors the negative-end current signal $I_2$ to a second current path CP42. The first transistor Q1 has a source receiving a supply voltage $V_{DD}$ and a drain coupled to the output terminal OUT. The second transistor Q2 has a source coupled to the output terminal OUT and a source receiving a ground voltage GND. The gate-to-source voltages of the transistors Q1 and Q2 are determined respectively according to currents flowing in the current paths CP41 and CP42.

The third transistor Q3 through which the positive-end current signal $I_1$ flows has a drain and a gate coupled together, and a source receiving the supply voltage $V_{DD}$. The fourth transistor Q4 has a source receiving the supply voltage $V_{DD}$ and a gate coupled to the gate of the third transistor Q3. The fifth transistor Q5 has a drain and a gate coupled together, and a source receiving the ground voltage GND. The sixth transistor Q6 is coupled in the first current path CP41, and has a source receiving the ground voltage GND and a gate coupled to the gate of the fifth transistor Q5. The seventh transistor Q7 is coupled in the first current path CP41, and has a source receiving the supply voltage $V_{DD}$ and a gate and drain commonly coupled to the gate of the first transistor Q1.

The eighth transistor Q8 through which the negative-end current signal $I_2$ flows has a drain and a gate coupled together, and a source receiving the supply voltage $V_{DD}$. The ninth transistor Q9 is coupled in the second current path CP42, and has a source receiving the supply voltage $V_{DD}$ and a gate coupled to the gate of the eighth transistor Q8. The tenth transistor Q10 is coupled in the second current path CP42, and has a source receiving the ground voltage GND and a drain and a gate commonly coupled to the gate of the second transistor Q2.

The receiver further includes NMOS transistors Q11 and Q12, and a bias voltage generation circuit composed of PMOS transistors Q15, Q16 and Q17, and NMOS transistors Q13 and Q14. The eleventh transistor Q11 through which the positive-end current signal $I_1$ flows has a drain coupled to the drain of the third transistor Q3. The twelfth transistor Q12 through which the negative-end current signal $I_2$ flows has a drain coupled to the drain of the eighth transistor Q8. The bias voltage generation circuit provides bias voltages as gate-to-source voltages of the transistors Q11 and Q12 such that they are turned on.

The thirteenth transistor Q13 is coupled in a third current path CP43, and has a drain coupled to the gate of the eleventh transistor Q11 and a gate coupled to the source of the eleventh transistor Q11. The fourteenth transistor Q14 is coupled in a fourth current path CP44, and has a drain coupled to the gate of the twelfth transistor Q12 and a gate coupled to the source of the twelfth transistor Q12.

The transistors Q15, Q16 and Q17 form a current mirror mirroring a bias current $I_B$ to the current paths CP43 and CP44. The fifteenth transistor Q15 through which the bias current $I_B$ flows has a source receiving the supply voltage $V_{DD}$ and a drain and a gate coupled together. The sixteenth transistor Q16 has a source receiving the supply voltage $V_{DD}$, a gate coupled to the gate of the fifteenth transistor Q15 and a drain coupled to the drain of the thirteenth transistor Q13. The seventeenth transistor Q17 has a source receiving the supply voltage $V_{DD}$, a gate coupled to the gate of the fifteenth transistor Q15 and a drain coupled to the drain of the fourteenth transistor Q14.

If the positive-end current signal $I_1$ has a current value larger than that of the negative-end current signal $I_2$, the voltage level on the output terminal OUT is the supply voltage $V_{DD}$. If the positive-end current signal $I_1$ has a current value smaller than that of the negative-end current signal $I_2$, the voltage level on the output terminal OUT is the ground voltage GND. The voltage level of the output terminal OUT is only related to the current signals $I_1$ and $I_2$. Therefore, the noise interference at the input terminal of the current-mode differential receiver 400 can be eliminated.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A current-mode differential transmitter receiving a single-end input voltage signal, and accordingly generating a differential output current signal, the transmitter comprising:
    a first switch coupled in a first current path and controlled by the single-end input voltage signal;
    a second switch coupled in a second current path and controlled by an inverted signal of the single-end input voltage signal;
    a third switch having one end receiving a supply voltage and the other end coupled to one end of the first switch, and controlled by the inverted signal of the single-end input voltage signal; and
    a current mirror mirroring a reference current to the first current path when the first switch is turned on, and mirroring the reference current to the second current path when the second switch is turned on;
    wherein the differential output current signal is derived from the currents on the first and second current paths.

2. A current-mode differential transmitter receiving a single-end input voltage signal, and accordingly generating a differential output current signal, the transmitter comprising:
    a first switch coupled in a first current path and controlled by the single-end input voltage signal;
    a second switch coupled in a second current path and controlled by an inverted signal of the single-end input voltage signal;
    a third switch having one end receiving a supply voltage and the other end coupled to one end of the first switch, and controlled by the inverted signal of the single-end input voltage signal;
    a fourth switch having one end receiving the supply voltage and the other end coupled to one end of the second switch, and controlled by the single-end input voltage signal; and
    a current mirror mirroring a reference current to the first current path when the first switch is turned on, and mirroring the reference current to the second current path when the second switch is turned on;
    wherein the differential output current signal is derived from the currents on the first and second current paths.

3. The current-mode differential transmitter according to claim 2, wherein the current mirror further mirrors the reference current to a third current path and a fourth current path, and the differential output current signal is a difference between a sum of the currents on the first and third current paths, and a sum of the currents on the second and fourth current paths.

4. The current-mode differential transmitter according to claim 3, wherein the current mirror comprises:
    a first transistor having a drain receiving the supply voltage and a gate coupled to the drain;
    a second transistor having a drain coupled to a source of the first transistor, a gate receiving the supply voltage and a source receiving a ground voltage;
    a third transistor coupled in the first current path, and having a drain receiving the supply voltage, a gate coupled to the gate of the first transistor and a source coupled to one end of the first switch; and
    a fourth transistor coupled in the second current path, and having a drain receiving the supply voltage, a gate coupled to the gate of the first transistor and a source coupled to one end of the second switch;

wherein the reference current is a current flowing through the first and second transistors.

5. The current-mode differential transmitter according to claim 4, wherein the current mirror further comprises:
- a fifth transistor coupled in the third current path, and having a drain receiving the supply voltage and a gate coupled to the gate of the first transistor;
- a sixth transistor coupled in the third current path, and having a drain coupled to a source of the fifth transistor, a gate receiving the supply voltage and a source receiving the ground voltage;
- a seventh transistor coupled in the fourth current path, and having a drain receiving the supply voltage and a gate coupled to the gate of the first transistor; and
- an eighth transistor coupled in the fourth current path, and having a drain coupled to a source of the seventh transistor, a gate receiving the supply voltage and a source receiving the ground voltage.

6. The current-mode differential transmitter according to claim 5, wherein the first, second, third and fourth switches are implemented by MOS transistors.

7. The current-mode differential transmitter according to claim 6 further comprising:
- a ninth transistor having a drain and a source coupled together, and a gate coupled to the gate of the first transistor;
- a fifth switch controlled by the single-end input voltage signal, and having one end receiving the ground voltage and the other end coupled to the source of the ninth transistor;
- a sixth switch controlled by the inverted signal of the single-end input voltage signal, and having one end receiving the supply voltage and the other end coupled to the source of the ninth transistor;
- a tenth transistor having a drain and a source coupled together, and a gate coupled to the gate of the first transistor;
- a seventh switch controlled by the inverted signal of the single-end input voltage signal, and having one end receiving the ground voltage and the other end coupled to the source of the tenth transistor; and
- an eighth switch controlled by the single-end input voltage signal, and having one end receiving the supply voltage and the other end coupled to the source of the tenth transistor.

8. A current-mode differential receiver receiving a differential input current signal, and accordingly generating a single-end output voltage signal on an output terminal, the receiver comprising:
- a first current mirror mirroring a positive-end current signal of the differential input current signal to a first current path, and mirroring a negative-end current signal of the differential input current signal to a second current path;
- a first transistor coupled to the first current mirror and the output terminal; and
- a second transistor coupled to the first current mirror and the output terminal;
wherein the first current mirror comprises:
- a third transistor through which the positive-end current signal flows, having a drain and a gate coupled together, and a source receiving a supply voltage; and
- a fourth transistor having a source receiving the supply voltage and a gate coupled to the gate of the third transistor;

wherein gate-to-source voltages of the first and second transistors are determined respectively according to currents flowing in the first and second current paths.

9. The current-mode differential receiver according to claim 8, wherein the first current mirror further comprises:
- a fifth transistor having a drain and a gate coupled together, and a source receiving a ground voltage;
- a sixth transistor coupled in the first current path, and having a source receiving the ground voltage and a gate coupled to the gate of the fifth transistor;
- a seventh transistor coupled in the first current path, and having a source receiving the supply voltage and a gate and drain commonly coupled to the gate of the first transistor;
- an eighth transistor through which the negative-end current signal flows, having a drain and a gate coupled together, and a source receiving the supply voltage;
- a ninth transistor coupled in the second current path, and having a source receiving the supply voltage and a gate coupled to the gate of the eighth transistor; and
- a tenth transistor coupled in the second current path, and having a source receiving the ground voltage and a drain and a gate commonly coupled to the gate of the second transistor.

10. The current-mode differential receiver according to claim 9 further comprising:
- an eleventh transistor through which the positive-end current signal flows, having a drain coupled to the drain of the third transistor;
- a twelfth transistor through which the negative-end current signal flows, having a drain coupled to the drain of the eighth transistor; and
- a bias voltage generation circuit providing bias voltages as gate-to-source voltages of the eleventh and twelfth transistors such that the eleventh and twelfth transistors are turned on.

11. The current-mode differential receiver according to claim 10, wherein the bias voltage generation circuit comprises:
- a thirteenth transistor coupled in a third current path, and having a drain coupled to the gate of the eleventh transistor, a gate coupled to the source of the eleventh transistor and a source receiving the ground voltage;
- a fourteenth transistor coupled in a fourth current path, and having a drain coupled to the gate of the twelfth transistor, a gate coupled to the source of the twelfth transistor and a source receiving the ground voltage;
- a second current mirror mirroring a bias current to the third and fourth current paths.

12. The current-mode differential receiver according to claim 11, wherein the second current mirror comprises:
- a fifteenth transistor through which the bias current flows, having a source receiving the supply voltage and a drain and a gate coupled together;
- a sixteenth transistor having a source receiving the supply voltage, a gate coupled to the gate of the fifteenth transistor and a drain coupled to the drain of the thirteenth transistor; and
- a seventeenth transistor having a source receiving the supply voltage, a gate coupled to the gate of the fifteenth transistor and a drain coupled to the drain of the fourteenth transistor.

* * * * *